FIG. I

United States Patent Office 3,212,598
Patented Oct. 19, 1965

3,212,598
ACOUSTIC LOGGING SYSTEM
Warren L. Anderson, Bacliff, Tex., assignor to Halliburton Company, a corporation of Delaware
Filed May 12, 1960, Ser. No. 28,611
13 Claims. (Cl. 181—.5)

This invention generally relates to well logging systems, and more specifically relates to new and improved apparatus for measurement of the velocity of an acoustic pulse through earth formations and transmission of an indication of such velocity to the earth's surface.

Acoustic velocity measurements through earth strata have become generally accepted as a significant indication of the character of such strata. In a method presently considered most useful, a voltage signal is produced which is proportional to the elapsed time interval occurring between the arrivals of an acoustic pulse at two acoustic receivers vertically disposed within a well bore in spaced apart relation with respect to one another and an acoustic pulse transmitter. This signal is plotted or recorded in correlation with the depth of the detectors within the bore to provide a continuous log through various sections of adjacent earth strata. This method is generally referred to as the "two receiver method." In another form, known as the "single receiver method," a signal is derived which is proportional to the elapsed time interval of arrival of an acoustic pulse at a single acoustic receiver disposed within a well bore in spaced apart relation with respect to an acoustic pulse transmitter. As commonly known, such measured time interval is dependent not only on the pulse velocity through the adjacent earth formation but also dependent on its velocity through intervening bore hole fluids of acoustic properties which may be varied by changes in well bore diameter, changes in position of the logging apparatus within the well bore, inclination of the tool within a well bore and other similar considerations. General apparatus of this type is shown by Summers Reissue No. 24,446, and Loofbourrow No. 2,931,-455, for example.

In the two receiver method such variable paths tend to be cancelled if the spacing between the receivers is kept within reasonable limits. However, despite the discussed uncertainty of the single receiver method, there are circumstances where the single receiver log is considered of value, particularly because the usual greater distance between the transmitter and a single receiver permits averaging of the acoustic travel time through a broader section of earth strata. It may be desirable in many situation to run to obtain simultaneous logs by both the single receiver and two receiver method. Misleading indications may often be detected by direct comparison between the two.

Prior art systems for acoustic velocity logging generally have been limited to the use of multi-conductor logging cables which provide interconnection of the surface and sub-surface equipment for transmission of the receiver signals, control signals and power voltages. Since such signals are alternating in character, mutual coupling, i.e., "crosstalk" between conductors presents serious problems, particularly with the high frequencies employed by such apparatus.

Since pulse transmission in commercially available logging cables is rapid, but finite due to the combined effects of cable capacitance and inductance, delays up to several microseconds per thousand feet of cable may be encountered. Since present logging cables are commonly provided in lengths of fifteen to twenty thousand feet, control operations dependent upon control signal transmission between sub-surface and surface equipment becomes difficult with time intervals shorter than the minimum acoustic travel time measured. Consequently, more accurate determination of short transit times would be possible if the signals transmitted between the surface and sub-surface were not effected by logging cable characteristics.

If other simultaneous measurements of formation characteristic become necessary for proper interpretation, such as a caliper and/or a radioactivity log, additional conductors through the cable must be provided with consequent increase in crosstalk between signal and control elements or increase in complexity to the sub-surface and surface equipment.

It is accordingly the general object of this invention to provide new and improved apparatus for measuring and transmitting an indication of the transit time of an acoustic pulse through a selected portion of earth strata.

Another object of this invention is to provide improved apparatus whereby an indication of both single receiver transit time and two receiver transit time may be simultaneously transmitted over a single conductor of such logging cable.

Another object of this invention is to provide variations in spacing between the transmitter and respective receivers by remote means.

For these and other objects, and for more complete understanding of the present invention, reference may be had to the following complete description taken in conjunction with the drawing in which.

Figure 2:
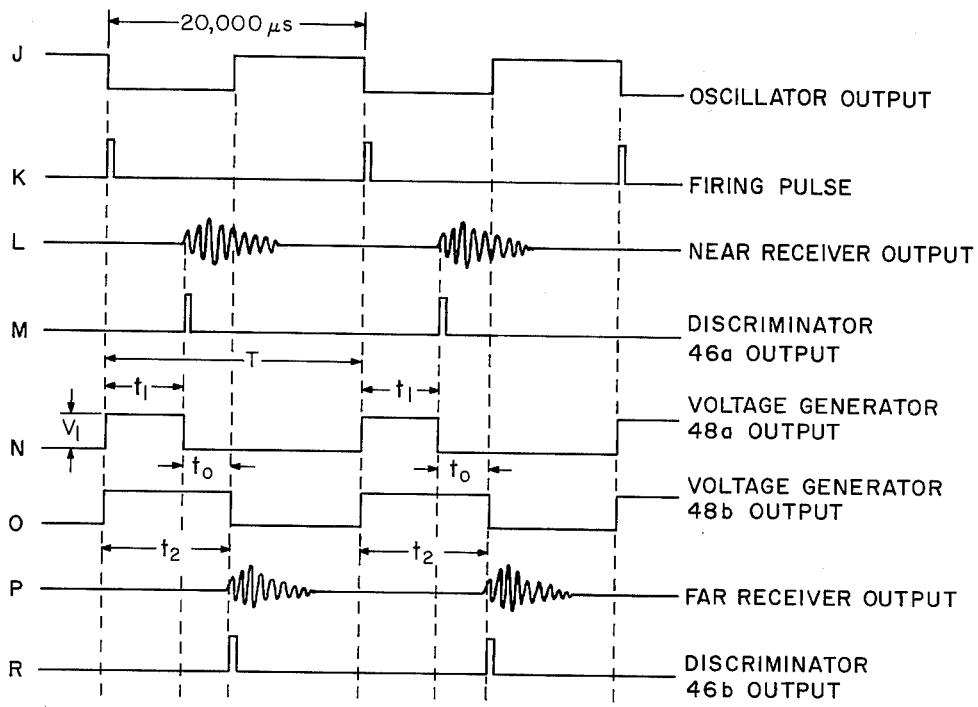
FIGURE 2 is a graph of various voltage wave forms produced in operation of the present invention.

Referring to FIGURE 2, there is illustrated a train of square waves N having amplitude $V_1$, width $t_1$ and a repetition interval T. The average voltage value $E_x$ over the full interval T of a train of such illustrated square waves is given by:

$$E_x = \frac{V_1 t_1}{T}$$

If the repetition interval T and the amplitude $V_1$ are held constant, then the average voltage at a given time is proportional to the prevailing pulse widths $t_1$ of voltage train N. Such a wave form may be passed through a low pass filter to recover the D.C. component with consequent indication of pulse width $t_1$ as a D.C. voltage.

It is to be understood that any such low pass filter provided in this invention should function to convert a repetitive voltage pulse train of frequency, for example, from 33⅓ to 50 c.p.s., into a smooth direct current voltage of amplitude which is maintained responsive as a function of the prevailing pulse duration of the voltage train. Filters suitable for this function may be of the L-C type, the passive R-C type and the active R-C type. Such low pass filters will be readily suggested to those skilled in the art. For recent example, suitable R-C type low pass filters are mentioned by Fryer in the April 10, 1959, issue of Electronics (a McGraw-Hill publication), and by Meyer in the April, 1960, issue of Electrical Design News (a Rogers publication).

Figure 1:
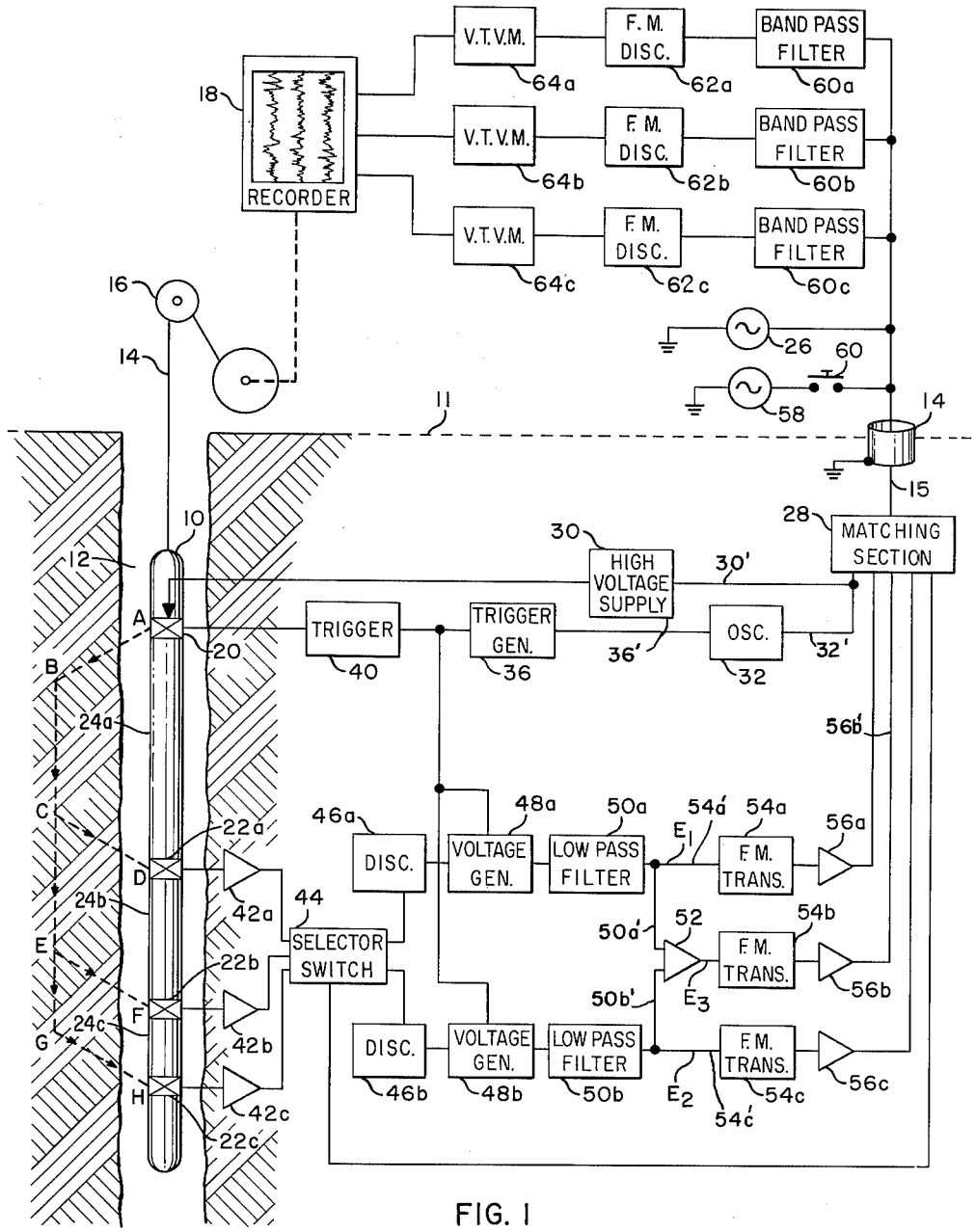
FIGURE 1 is a schematic block diagram of a logging system constructed in accordance with the present invention.

Referring now to FIGURE 1, there is illustrated a logging tool 10, suspended in a well bore 12 from a logging cable 14. A hoisting means 16 is provided at the earth's surface, indicated by the dashed line 11, in connection with cable 14 to raise or lower tool 10 as required. Connected in responsive relation to hoisting means 16 is a recorder 18. Disposed within tool 10 is an electronic section shown in schematic block form at the right of the tool. Mounted within tool 10 is an acoustic pulse transmitter 20. This transmitter may be a transducer of the electrostrictive, piezoelectric, or magnetostrictive type. As herein exampled, transmitter 20 may be advantageously provided of electrostrictive material such as barium titanate or lead zirconate.

Disposed in spaced apart relation with respect to transmitter 20 and with respect to one another are a plurality of receiver transducers 22a, 22b and 22c. These receivers may be similar or even identical in construction to that of transmitter 20.

Disposed in supporting relation between transmitter 20 and each of receivers 22a, 22b and 22c, are isolation sections 24a, 24b and 24c. The purpose of these isolation sections is for delaying the transmission of the acoustic pulse from the transmitter through the tool body proper until after such time as the pulse has arrived at the receivers through the adjacent earth formation. These isolation sections may be constructed in accordance with the disclosure of Summers et al., No. 2,987,478, if desired.

The optimum spacing between the receivers of velocity logging apparatus has not been settled. For two receiver tools, a spacing of one foot between such receivers may be considered most desirable under certain conditions and spacings of two, three or more feet may be considered most desirable under others. Spacings presently considered acceptable, for example, and provided for this invention are three feet between transmitter 20 and receiver 22a, two feet between receiver 22a and receiver 22b and one foot between receiver 22b and 22c. When using such dimensions, the spacing for pulse interval measurement between a connected pair of the receivers, 22a, 22b and 22c, can be one, two or three feet, depending on the pair of receivers chosen. The paths of the acoustic pulse through the surrounding earth formation is generally shown by the dashed lines, A, B, C, and D from transmitter 20 to receiver 22a, A, B, E, and F from the transmitter 20 to the receiver 22b, and A, B, G, and H between the transmitter 20 and the receiver 22c.

Alternating current power, at 400 cycles, for example, is supplied to tool 10 through a conductor 15 of cable 14, and a matching section 28 from a surface located power supply means 26. Connected to conductor 15 through matching section 28 is an oscillator 32 and a high voltage supply circuit 30. High voltage supply circuit 30 is connected to transmitter 20. The purpose of oscillator 32 is to provide a key frequency, for example, 33⅓ c.p.s. or 50 c.p.s., illustrated in FIGURE 2 as a voltage J.

The output of oscillator 32 is connected into a trigger generator 36. The output of trigger generator 36 is illustrated in FIGURE 2 as a voltage K. Trigger generator 36 is connected to the control element of a trigger circuit 40, such as a thyratron, which periodically triggers transmitter 20 at a repetition rate established by oscillator 32. The output of trigger generator 36 is also connected to control elements of square wave generator circuits 48a and 48b.

Respectively connected in series with each receiver transducer 22a, 22b and 22c are amplifiers 42a, 42b and 42c. The outputs of amplifiers 42a, 42b and 42c are respectively connected to switch terminals of a selector switch 44. Selector switch 44 is provided for remote operation from the surface by means of a source of switching voltage 58, at sixty cycles for example, connected through a switch 60, conductor 15 and matching section 28 to the switch. As provided, each closure of switch 60 will discretely move switch 44 to a successive position. Other switch terminals of switch 44 are connected into pulse height discriminator circuits 46a and 46b.

As provided, either of receivers 22a and 22b may be connected to discriminator 46a and either of receivers 22b or 22c can be connected to discriminator 46b with the result that any two of the receivers 22a and 22b and 22c may be connected to receiver discriminators 46a and 46b to provide effective receiver spacing of one, two or three feet. When desirable, other dimensional relations between the receivers may of course be provided when constructing tool 10.

The output of discriminators 46a and 46b are respectively connected to the inputs of square wave generators 48a and 48b. As provided, each of generators 48a and 48b provide a square wave voltage of a prescribed constant amplitude which voltage is initiated by a pulse from trigger generator 36 and terminated by a pulse from its respective discriminator.

The outputs of the square wave generators 48a and 48b, respectively illustrated as voltages N and O, are connected to low pass filters 50a and 50b. As previously mentioned, the purpose of filters 50a and 50b is to convert the square wave pulse train from each of generators 48a and 48b into D.C. voltages $E_1$ and $E_2$ respectively. D.C. voltage $E_1$ is then representative of the prevailing time interval $t_1$ between a pulse from trigger generator 36 and an acoustic pulse received at the nearest connected receiver. D.C. voltage $E_2$ is representative of the prevailing time interval $t_2$ between a pulse from trigger generator 36 and an acoustic pulse received at a far connected receiver. The outputs of low pass filters 50a and 50b are respectively connected into a difference amplifier 52. The output of difference amplifier 52 is a direct current voltage $E_3$ which is equal to voltages $E_2-E_1$. Voltage $E_3$ is representative of the time interval $t_0$ of pulse travel between the far and near connected receivers.

Low pass filter 50a is also connected into a frequency modulated signal transmitter circuit 54a. Transmitter 54a may contain a chopper circuit to convert voltage $E_1$ to an alternating current voltage for modulation of a frequency modulated oscillator operating at 8 kc., for example. The output of FM transmitter 54a is connected through an amplifier 56a and matching section 28 to conductor 15.

The output $E_3$ of amplifier 52 is connected into a frequency modulated transmitter 54b, which output is connected through an amplifier 56b and matching section 28 to conductor 15. FM transmitter 54b may operate at 10.5 kc., for example. The output $E_2$ of low pass filter 50b is also connected into a frequency modulated transmitter 54c which output is connected through an amplifier 56c and matching section 28 to conductor 15. FM transmitter 54c may operate at 12.3 kc., for example. The outputs of amplifiers 54a, 54b and 54c are frequency modulated signals respectively representative of $E_1$, $E_3$ and $E_2$.

At the earth's surface conductor 15 is connected into each of band pass filter circuits 60a, 60b and 60c. As provided, each of filters 60a, 60b and 60c pass only the one signal frequency of one of transmitters 54a, 54b and 54c. The outputs of filters 60a, 60b and 60c are respectively connected into frequency modulated discriminators 62a, 62b and 62c which outputs are voltages representative of $E_1$, $E_3$ and $E_2$. The outputs of FM discriminators 62a and 62b and 62c are connected into voltmeters 64a, 64b and 64c which outputs are connected into recorder 18. Further information regarding FM transmitter systems may be found by reference to commonly assigned Patent No. 2,573,133, to W. J. Greer.

As shown, the output of voltmeter 64a is representative of the time interval of pulse travel from transmitter 20 to the nearest connected receiver. The output of voltmeter 64c is representative of the time interval of pulse travel from transmitter 20 to the far connected receiver. The output of voltmeter 64b is representative of the time interval of pulse travel between the two connected receivers. As provided, any one or combination of these signals may be concurrently indicated and recorded by recorder 18.

Figure 3:
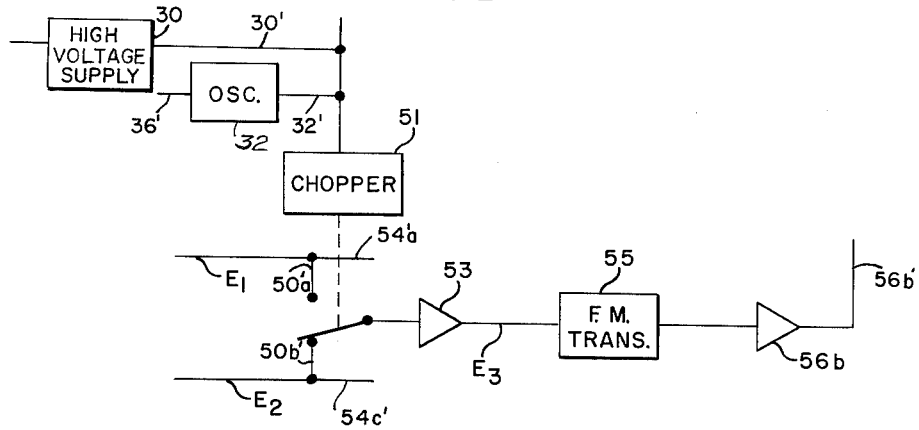
FIGURE 3 is an alternate embodiment of the sub-surface equipment shown in FIGURE 1.

Referring now to FIGURE 3, there is disclosed an alternate embodiment for obtaining the two receiver interval voltage $E_3$. As shown, the output from a low pass filter 50a is connected to a switch terminal of a chopper switch 51. The output from a low pass filter 50b is connected into an alternate switch terminal of chopper 51. Chopper 51 is connected into an amplifier 53. Chopper 51 is driven by the power current provided through conductor 15 and matching section 28. In operation, $E_3$ will appear as an alternating current voltage of amplitude equal to the differences in direct current voltages $E_1$ and $E_2$. The output of amplifier 53 is connected into a frequency modulated transmitter 55 which output is connected through an amplifier 56b for connection to the earth's surface. When using the embodiment of FIGURE 3 rather than the difference amplifier 52 of FIGURE 1, switch 51 may serve in lieu of a chopper included with transmitter 54b as previously described.

As previously mentioned, it may be desirable or necessary to obtain other measurements of earth formation characteristics taken concurrently and at the same reference level as the acoustic pulse travel measure. A caliper log indicating the well bore diameter variation has been mentioned as one desired measurement. A radioactivity log, such as a natural gamma measurement or a neutron induced gamma or neutron measurement, has also been mentioned as being desirably significant in conjunction with the acoustic pulse velocity log. A further significant measurement to be desired is the D.C. spontaneous potential measurement.

In the embodiment of FIGURE 1, the spontaneous potential (SP) measurement may be concurrently taken by provision of a logging electrode provided at a desired reference level on tool 10. The voltage detected at the SP electrode may be connected to cable 15 through appropriate filter components of matching section 28 then taken off cable 15 through suitable filters for amplification and recording in recorder 18 in correlation with the acoustic pulse travel measurements previously described. It is to be noted that such ease in obtaining the SP voltage signal is permitted by a highly desirable feature of the present invention which is that no conflicting D.C. voltages exist on the conductor 15.

The previously mentioned caliper and/or radioactivity sensing elements, which are commonly known, may be incorporated in tool 10 with signal outputs suitable for driving transmitters such as 54a, 54b and 54c of respective noninterfering channel freqeuncies, for example, 14.5 kc. and 22.0 kc.

When such other measurements are taken, or otherwise if desired, a difference amplifier of the nature indicated at 52 in FIGURE 1 or a switching arrangement of the nature indicated in FIGURE 2 may be connected between the outputs of voltmeter 64a and 64c to produce the signal voltage $E_3$, previously mentioned as being representative of the time interval of pulse travel between two connected receivers. In this event the transmitter 54b may be eliminated or used to provide signal transmission of such other desired measurements. Also, the output of FM discriminators 62a and 62c usually are alternating signals of some low frequency such as 200 cycles, which amplitude is respectively representative of $E_1$ and $E_2$. Therefore, means of obtaining the voltage difference between discriminators 62a and 62c may be provided to obtain a signal equal to the output of discriminator 62b which in turn is representative of the two receiver pulse interval voltage $E_3$.

It is now seen that the present invention provides extremely desirable flexibility in construction of an acoustic velocity logging tool with the various correlating measuring equipment desired or required to permit superior interpretation of the well log developed by recorder 18.

In operation, alternating current power is transmitted into the tool through conductor 15 and matching section 28 to actuate high voltage supply 30, oscillator 32, and the other various D.C. power and biasing voltages (not shown), required for proper operation of the disclosed sub-surface circuit components.

Oscillator 32 produces a square wave voltage of an advantageous low frequency, for example, at 33⅓ or 50 c.p.s. Such voltage is illustrated in FIGURE 2 as a 50 c.p.s. alternating current voltage J. Voltage J is received by trigger generator 36, which produces a firing pulse illustrated as voltage K in response to each negative excursion of the voltage J. The firing pulse K is connected into trigger circuit 40 to cause firing of the transmitter 20 on each occurrence of a firing pulse, shown by FIGURE 2, to be at a repetition rate of 50 c.p.s. Firing pulse K concurrently actuates square wave generators 48a and 48b, to initiate the square wave voltages N and O of FIGURE 2. Arrival of the acoustic pulse at each connected receiver, illustrated as voltages L and P, creates a voltage pulse which is passed through its respective amplifier and switch 44 to discriminators 46a and 46b. Discriminators 46a and 46b which are of the pulse height type, emit a respective pulse, illustrated as voltages M and R, in response to the first detectable portion of the receiver pulse having amplitude above spurious acoustic and circuit noise. The outputs of discriminators 46 and 46b respectively terminate the voltages N and O, produced by the square wave generator 48a and 48b, respectively. The voltages N and O are respectively fed into low pass filters, 50a and 50b, which respectively produce D.C. outputs $E_1$ and $E_2$ of magnitudes which are respectively direct functions of the pulse intervals of voltages N and O, respectively.

Each of the voltages $E_1$, $E_2$, $E_3$ respectively modulate the transmitters 54a, 54c and 54b, each of which in turn place a frequency modulated carrier signal through matching section 28 onto conductor 15.

At the earth's surface each carrier frequency is separated by the respective band pass filters 60a, 60b and 60c. Voltages representative of $E_1$, $E_2$ and $E_3$ are then discriminated from their respective carrier by discriminators 62a, 62c and 62b, respectively, and are respectively passed through voltmeters 64a, 64c and 64b for indication and recording at recorder 18.

As previously mentioned, a difference amplifier such as illustrated to produce voltage $E_3$ may be provided at the earth's surface. The output of discriminators 62a and 62c may be fed into such an amplifier and its output passed through a voltmeter such as 64c for recording. Alternately, the outputs of voltmeters 64a and 64c may be fed into such an amplifier and its output directly passed to recorder 18.

In the event that other measurement apparatus is provided in combination with tool 10, the output of such detection means may be fed into a combination transmitter receiver arrangement such as transmitter 54a, band pass filter 60a, FM discriminator 62a, voltmeter 64a, and concurrently recorded at recorder 18.

It is therefore pointed out that other modifications and variations of the invention such as above set forth may be made without departing from its spirit and scope. Therefore, only such limitations should be imposed as mandated by the appended claims.

What I claim is:

1. An acoustic logging system comprising: a logging tool body adapted for suspension within a borehole by a wireline from the earth's surface; a transmitter transducer in said body adapted to transmit an acoustic pulse in response to an initiating signal; means in said body connected with said transducer for supplying said initiating signal to the same; first and second receiver transducers spaced from said transmitter transducer and one another in said body and adapted responsive to reception of acoustic pulses from said transmitter transducer to respectively generate first and second output signals; first and second voltage generator means connected to the first-mentioned means and further respectively connected to said first and second receiver transducers, said first and second generator means adapted to produce a constant amplitude voltage in response to said initiating signal and, further respectively adapted to terminate their respective constant amplitude voltages in response to receipt of said respective first and second output signals; first and second low-pass filter means respectively connected to said first and second voltage generator means and respectively producing an output of direct current voltage representative of the duration of the constant amplitude voltages produced respectively by said first and second voltage generator means; difference means connected to said filter means, outputs for receiving both said direct current voltages and for producing a signal representative of the difference in duration of said constant amplitude voltages; means for applying the last-mentioned signal to the wireline for transmission to the earth' surface, the last mentioned means being disposed in said body; and receiving means at the earth's surface connected to said wireline for concurrently indicating and recording said last-mentioned signal.

2. The system of claim 1 wherein said diffifference means comprises a difference amplifier producing an output voltage equal to the difference in amplitude between two input voltages.

3. The system of claim 1 wherein said difference means comprises a switch alternately conected to said generators and producing an alternating output equal to the difference in magnitude of said input voltages.

4. The system of claim 1 wherein each said low pass filter comprises an L-C circuit.

5. The system of claim 1 wherein the said each low pass filter comprises an R-C circuit.

6. The system of claim 1 wherein each of said low pass filter comprises an active R-C circuit.

7. The system of claim 1 wherein said means for applying comprises frequency modulated transmitter means receiving said voltages and transmitting a discrete signal of prescribed carrier center frequency representing each said voltage.

8. The system of claim 1 including a first pulse height discriminator means interconnecting said first receiver transducer and said first voltage generator means and a pulse height second discriminator means interconnecting said second receiver transducer and said second voltage generator means, said first and second discriminator means respectively producing pulses for respectively controlling said first and second generator means in response to a receiver output signal of predetermined amplitude.

9. An acoustic logging system comprising: a logging tool body adapted for suspension within a borehole by a wireline from the earth's surface; a transmitter transduce in said body adapted to transmit an acoustic pulse in response to an initiating signal; means in said body connected with said transducer for supplying said initiating signal to the same; first and second receiver transducers spaced from said transmitter transducer and one another in said body and adapted responsive to reception of acoustic pulses from said transmitter transducer to respectively generate first and second output signals; first and second voltage generator means connected to the first-mentioned means and further respectively connected to said first and second receiver transducers, and first and second generator means adapted to produce a constant amplitude voltage in response to said initiating signal and, further, respectively adapted to terminate their respective constant amplitude voltages in response to a predetermined magnitude of said respective first and second output signals; first and second low-pass filter means respectively connected to said first and second voltage generator means and respectively producing an output of direct current voltage representative of the duration of the constant amplitude voltage produced respectively by the constant amplitude voltage produced respectively by said first and second voltage generator means; difference means connected to said low-pass filter means outputs for receiving both said direct current voltages and for producing a signal representative of the difference in duration of said constant amplitude voltages; means for applying the last-mentioned signal to the wireline for transmission to the earth's surface, the last mentioned means being disposed in said body; and receiving means at the earth's surface connected to said wireline for concurrently indicating and recording said last-mentioned signal.

10. An acoustic logging system comprising: a logging tool body adapted for suspension within a borehole by a wireline from the earth's surface; a transmitter transducer in said body adapted to transmit an acoustic pulse in responsive to an initiating signal; means in said body connected with said tranducer for supplying said initial signal to the same; at least three receiver transducers spaced from said transmitter transducer and one another in said body and adapted responsive to reception of acoustic pulses from said transmitter transducer to respectively generate output signals; first and second voltage generator means connected to the first-mentioned means and further respectively connected to a selector pair of said receiver transducers, said first and second voltage generator means each adapted to produce a constant amplitude voltage in response to said initiating signal and, further, respectively adapted to terminate their respective constant amplitude voltages in response to receipt of output signals respectively from first and second members of said pair; first and second low-pass filter means respectively connected to said first and second voltage generator means and respectively producing an output of direct current voltage representative of the duration of the constant amplitude voltage produced respectively by said first and second generator means; difference means connected to said filter means outputs for receiving both said direct current voltages and for producing a signal representative of the difference in duration of said constant amplitude voltages; means for applying the last-mentioned signal to the wireline for transmission to the earth's surface, said means for applying being disposed in said body; and receiving means at the earth's surface connected to said wireline for concurrently indicating and recording said last-mentioned signal.

11. An acoustic logging system comprising: a logging tool body adapted for suspension within a borehole by a wireline from the earth's surface; a transmitter transducer in said body adapted to transmit an acoustic pulse in response to an initiating signal; means in said body connected with said transducer for supplying said initiating signal to the same; at least three receiver transducers spaced from said transmitter transducer and one another in said body and adapted responsive to reception of acoustic pulses from said transmitter transducer to respectively generate output signals; means for selecting a pair of said receivers by connecting to the outputs thereof; first and second voltage generator means connected to the first-mentioned means and further respectively connected to one receiver transducer of said selected pair of receiver transducers through said pair selecting means, said first and second generator means each adapted to produce a constant amplitude voltage in response to said initiating signal and, further, respectively adapted to terminate their respective constant amplitude voltages in response to receipt of said output signals from the respectively connected ones of said pair; first and second low-pass filler means respectively connected to said first and second generator means and respectively producing an output of direct current voltage representative of the duration of the constant amplitude voltage produced respectively by said first and second generator means; difference means connected to said low pass filter means outputs for receiving both said direct current voltages and for producing a signal representative of the difference in duration of said constant amplitude voltages; means for applying the last-mentioned signal to the wireline for transmission to the earth's surface, said means for applying being disposed in said body; and receiving means at the earth's surface connected to said wireline for concurrently indicating and recording said last mentioned signal.

12. A system of claim 11 wherein said means for selecting a pair of receivers is a switch remotely controllable by means of said wireline from the earth's surface.

13. The system of claim 11 wherein said receiving means at the earth's surface for indicating and recording said last-mentioned signal includes means for recording said signal in correlation with the depth location of said body within said borehole.

References Cited by the Examiner

UNITED STATES PATENTS

| | | |
|---|---|---|
| 2,190,686 | 2/40 | Slichter. |
| 2,539,623 | 1/51 | Heising. |
| 2,708,485 | 5/55 | Vogel _____ 181—0.5 |
| 2,813,590 | 11/57 | McDonald _____ 181—0.5 |
| 2,841,778 | 7/58 | Ball et al. _____ 181—0.5 |
| 2,887,172 | 5/59 | Hardway _____ 181—0.5 |
| 2,938,592 | 5/60 | Charske et al. _____ 181—0.5 |
| 2,949,973 | 8/60 | Broding et al. _____ 181—0.5 |
| 3,050,150 | 8/62 | Tixier _____ 340—18 X |
| 3,082,832 | 3/63 | Summers _____ 181—0.5 |

SAMUEL FEINBERG, *Primary Examiner.*

JOHN C. MacNAB, CHESTER L. JUSTUS,
*Examiners.*